United States Patent
Schofield

(10) Patent No.: US 7,131,754 B2
(45) Date of Patent: Nov. 7, 2006

(54) AUTOMATIC HEADLAMP CONTROL

(75) Inventor: Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 11/363,100

(22) Filed: Feb. 27, 2006

(65) Prior Publication Data
US 2006/0139937 A1 Jun. 29, 2006

Related U.S. Application Data

(63) Continuation of application No. 10/421,281, filed on Apr. 23, 2003, now Pat. No. 7,004,606.

(60) Provisional application No. 60/385,512, filed on Jun. 4, 2002, provisional application No. 60/374,694, filed on Apr. 23, 2002.

(51) Int. Cl.
B60Q 1/08 (2006.01)
B60Q 1/02 (2006.01)

(52) U.S. Cl. ............ 362/466; 362/460; 362/276; 315/82

(58) Field of Classification Search ........ 362/464–466; 315/82; 250/205; 382/104
See application file for complete search history.

(56) References Cited

U.S. PATENT DOCUMENTS

| | | | |
|---|---|---|---|
| 2,632,040 A | 3/1953 | Rabinow | 175/321 |
| 2,827,594 A | 3/1958 | Rabinow | 315/83 |
| 4,037,134 A | 7/1977 | Loper | 315/78 |
| 4,236,099 A | 11/1980 | Rosenblum | 315/83 |
| 4,355,271 A | 10/1982 | Noack | 318/480 |
| 4,357,558 A | 11/1982 | Massoni et al. | 315/83 |
| 4,481,450 A | 11/1984 | Watanabe et al. | 318/444 |
| 4,620,141 A | 10/1986 | McCumber et al. | 318/483 |
| 4,692,798 A | 9/1987 | Seko et al. | 348/118 |
| 4,727,290 A | 2/1988 | Smith et al. | 315/82 |
| 4,862,037 A | 8/1989 | Farber et al. | 318/83 |
| 4,867,561 A | 9/1989 | Fujii et al. | 356/237 |
| 4,871,917 A | 10/1989 | O'Farrell et al. | 250/341 |
| 4,891,559 A * | 1/1990 | Matsumoto et al. | 315/82 |
| 4,917,477 A | 4/1990 | Bechtel et al. | 350/357 |
| 4,956,591 A | 9/1990 | Schierbeek et al. | 318/483 |
| 4,967,319 A | 10/1990 | Seko | 362/61 |

(Continued)

FOREIGN PATENT DOCUMENTS

DE 2946561 A 5/1981

(Continued)

OTHER PUBLICATIONS

Article entitled "Generation of Vision Technology," published by VLSI Vision Limited, publication date unknown.

(Continued)

Primary Examiner—Ali Alavi
(74) Attorney, Agent, or Firm—Van Dyke, Gardner, Linn & Burkhart, LLP

(57) ABSTRACT

An automatic headlamp control system includes an image sensor and a control. The image sensor captures an image of a forward exterior scene and the control processes the image to determine if any light sources in the captured image are indicative of headlamps of oncoming vehicles or taillights of leading vehicles. The control adjusts the state of the headlamps between a high beam state and a lower beam state in response to such processing, and may adjust the beam illumination state of one headlamp independent of adjustment of the beam illumination state of the other headlamp. The control adjusts one headlamp to its lower beam state in response to a detection of a headlamp of an approaching vehicle in the forward field of view, and adjusts or maintains the beam illumination state of the other headlamp independent of the adjustment of the first headlamp in response to the detection.

19 Claims, 1 Drawing Sheet

U.S. PATENT DOCUMENTS

| | | | |
|---|---|---|---|
| 5,059,877 A | 10/1991 | Teder | 318/444 |
| 5,072,154 A | 12/1991 | Chen | 315/82 |
| 5,086,253 A | 2/1992 | Lawler | 315/83 |
| 5,124,549 A | 6/1992 | Michaels et al. | 250/237 |
| 5,182,502 A | 1/1993 | Slotkowski et al. | 315/159 |
| 5,313,072 A | 5/1994 | Vachss | 250/573 |
| 5,329,206 A | 7/1994 | Slotkowski et al. | 315/159 |
| 5,336,980 A | 8/1994 | Levers | 318/444 |
| 5,351,044 A | 9/1994 | Mathur et al. | 340/901 |
| 5,414,257 A | 5/1995 | Stanton | 250/227.25 |
| 5,426,294 A | 6/1995 | Kobayashi et al. | 250/226 |
| 5,461,357 A | 10/1995 | Yoshioka et al. | 340/435 |
| 5,471,515 A | 11/1995 | Fossum et al. | 377/60 |
| 5,498,866 A | 3/1996 | Bendicks et al. | 250/227.25 |
| 5,515,448 A * | 5/1996 | Nishitani | 382/106 |
| 5,535,314 A | 7/1996 | Alves et al. | 395/131 |
| 5,537,003 A | 7/1996 | Bechtel et al. | 315/82 |
| 5,550,677 A | 8/1996 | Schofield et al. | 359/604 |
| 5,633,710 A * | 5/1997 | Kumra et al. | 356/139.08 |
| 5,650,944 A | 7/1997 | Kise | 364/561 |
| 5,660,454 A * | 8/1997 | Mori et al. | 362/466 |
| 5,661,303 A | 8/1997 | Teder | 250/341.8 |
| 5,670,935 A | 9/1997 | Schofield et al. | 340/461 |
| 5,760,962 A | 6/1998 | Schofield et al. | 359/604 |
| 5,796,094 A | 8/1998 | Schofield et al. | 250/208.1 |
| 5,837,994 A | 11/1998 | Stam et al. | 250/208.1 |
| 5,844,682 A | 12/1998 | Kiyomoto et al. | 356/369 |
| 5,877,897 A | 3/1999 | Schofield et al. | 359/604 |
| 5,923,027 A | 7/1999 | Stam et al. | 250/208.1 |
| 5,949,331 A | 9/1999 | Schofield et al. | 340/461 |
| 5,990,469 A | 11/1999 | Bechtel et al. | 250/208.1 |
| 6,020,704 A | 2/2000 | Buschur | 318/483 |
| 6,049,171 A | 4/2000 | Stam et al. | 315/82 |
| 6,084,519 A | 7/2000 | Coulling et al. | 340/602 |
| 6,087,953 A | 7/2000 | DeLine et al. | 340/815.4 |
| 6,097,023 A | 8/2000 | Schofield et al. | 250/208.1 |
| 6,097,024 A | 8/2000 | Stam et al. | 250/208.1 |
| 6,124,886 A | 9/2000 | DeLine et al. | 348/148 |
| 6,144,022 A | 11/2000 | Tenenbaum et al. | 250/208.1 |
| 6,172,613 B1 | 1/2001 | DeLine et al. | 340/815.4 |
| 6,222,447 B1 | 4/2001 | Schofield et al. | 340/461 |
| 6,313,454 B1 | 11/2001 | Bos et al. | 250/208.1 |
| 6,320,176 B1 | 11/2001 | Schofield et al. | 250/208.1 |
| 6,353,392 B1 | 3/2002 | Schofield et al. | 340/602 |
| 6,559,435 B1 | 5/2003 | Schofield et al. | 250/208.1 |
| 6,611,610 B1 | 8/2003 | Stam et al. | |
| 7,004,606 B1 | 2/2006 | Schofield | |
| 2002/0056805 A1 | 5/2002 | Bos et al. | 250/208.1 |

FOREIGN PATENT DOCUMENTS

| | | |
|---|---|---|
| EP | 0788947 A1 | 8/1997 |
| FR | 2641237 A | 7/1990 |
| WO | WO 8605147 A | 9/1986 |

OTHER PUBLICATIONS

Article entitled "On-Chip CMOS Sensors for VLSI Imaging Systems," published by VLSI Vision Limited, 1991.

* cited by examiner

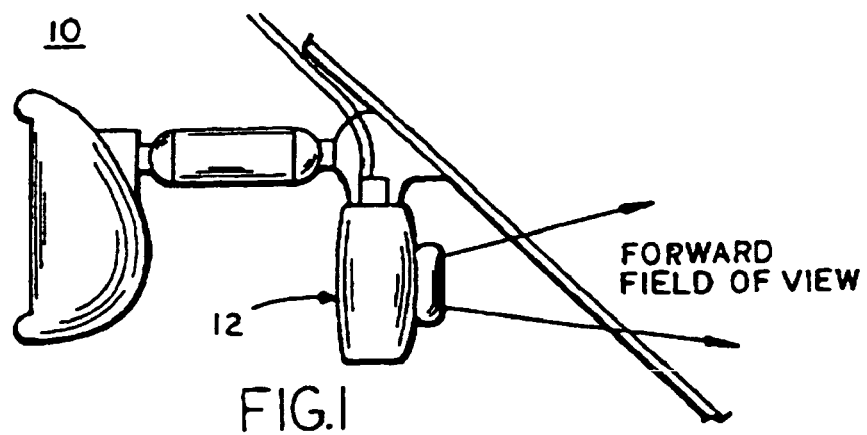
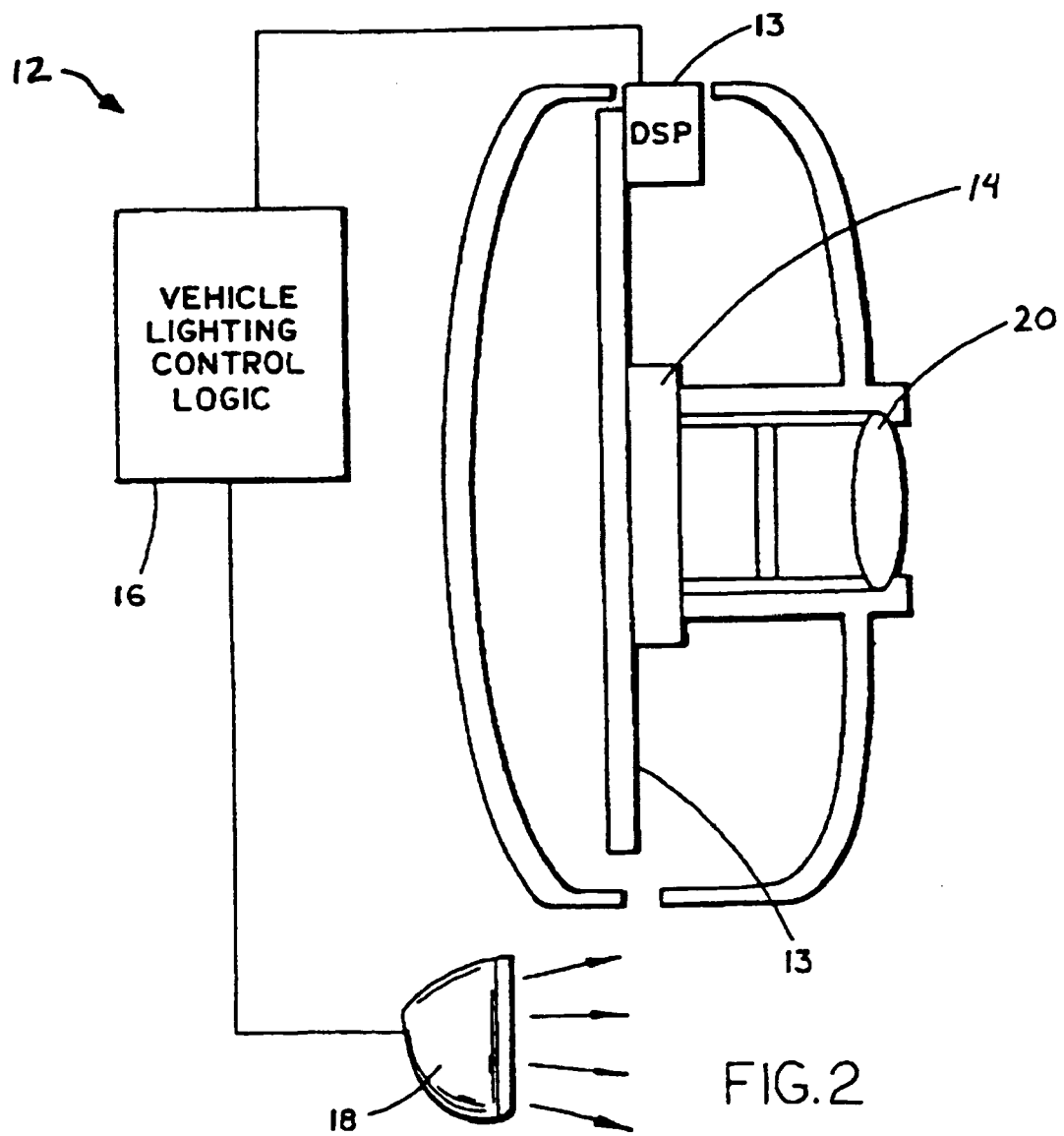

AUTOMATIC HEADLAMP CONTROL

CROSS REFERENCE TO RELATED APPLICATIONS

The present application claims priority as a continuation application of U.S. patent application Ser. No. 10/421,281, filed Apr. 23, 2003 now U.S. Pat. No. 7,004,606, which claims the benefit of U.S. provisional applications, Ser. No. 60/374,694, filed Apr. 23, 2002 by Schofield; and Ser. No. 60/385,512, filed Jun. 4, 2002 by Schofield, which are all hereby incorporated herein by reference in their entireties.

FIELD OF THE INVENTION

The present invention relates generally to a headlamp control for a vehicle and, more particularly, to a headlamp control which is operable to automatically control a headlamp of a vehicle between a low beam setting and a high beam setting.

BACKGROUND OF THE INVENTION

Several control systems have been proposed which automatically control the state of a vehicle's headlamps in order to accomplish automatically that which is typically manually performed by the driver. In particular, the driver of a vehicle whose headlamps are in a high-beam state may dim the headlights upon conscious realization that the headlamps are a distraction to a driver of an oncoming vehicle or a leading vehicle. It is desirable to relieve the driver of such duties and thereby allow the driver to concentrate on the driving task at hand. The ideal automatic control would also automatically activate the high beams in conditions which allow their use, increasing the safety for the controlled vehicle by increasing the visibility in front of the vehicle when it is appropriate to do so.

SUMMARY OF THE INVENTION

The present invention is intended to provide an automatic headlamp control which is operable to automatically adjust a headlamp of a vehicle between a high beam state and a low beam state. The headlamp control may be operable to distinguish between reflections of the controlled vehicle's headlamps and other vehicle headlamps in response to a modulation of the headlamps of the controlled vehicle.

According to an aspect of the present invention, an automatic headlamp control system includes at least one headlamp of the controlled vehicle, an image sensor, such as an imaging array sensor, and a control. The headlamp of the controlled vehicle is operable to at least occasionally emit a light output having at least one of a signature, a code and a pattern superimposed thereon. The image sensor has a field of view forwardly of the vehicle and captures an image of the scene forwardly of the vehicle. The control processes or analyzes the image to determine if a light source detected within the field of view is indicative of a headlamp of an oncoming vehicle or a taillight of a leading vehicle. The control may adjust the state of the headlamps of the controlled vehicle between a high beam state and a low beam state in response to the image processing. The control is operable to process the image to distinguish a reflection of the light output of the controlled vehicle's headlamps via recognition of the signature, code or pattern superimposed on the light output of the headlamps of the controlled vehicle. The control system may be operable to distinguish the reflection of the light output from the taillights of a leading vehicle, headlamps of an oncoming vehicle, other light sources, and/or reflections from other light sources.

For example, the light intensity output of the headlamps may be partially modulated or partially pulsed at a particular frequency or pattern, and/or may be emitted in a particular color or intensity, such that the steady state intensity of the headlamp (that is of sufficient intensity to illuminate the forward field of view of the road for the driver a sufficient distance, such as several hundred feet, forward of the vehicle) has superimposed thereon a signature or variation in amplitude, which is only a small variation in the amplitude intensity of the headlamp, such as less than approximately 25%, more preferably, less than approximately 10%, and most preferably, less than approximately 5%, of the amplitude, and such that the signature or coding or pattern or variation is preferably not noticeable or distinguishable to a human observer.

The headlamp control is then operable to recognize or distinguish the particular signature of the light output, such as the variation or modulation in the frequency, pattern, color and/or intensity of the emitted light, to determine that the light source detected in the frame or captured image is from a reflection of the headlamps of the controlled vehicle off of an object, such as a sign or the like. The particular signature or frequency of the headlamp output may be randomly set, such as each time the vehicle and/or headlamps are activated, or may be set for the particular vehicle, or may be set in response to a particular characteristic of the vehicle each time the vehicle is turned on or each time the headlamp control is actuated. The headlamps are preferably occasionally or temporarily operated in the coded or modulated manner, such as when the high beams are activated and when a light source of interest is detected in the captured image, and are otherwise constantly activated in a normal manner. Optionally, the headlamps may be modulated (and/or the headlamp control is operable to distinguish the modulated headlamp signal) only in situations where no oncoming headlamps have been detected and identified in the captured image.

The headlamp control system of the present invention may also be operable to vary the high beam state or low beam state of each of a pair of headlamps independently. For example, a left headlamp may be dimmed to the low beam state, while a right headlamp may be switched to the high beam state. Optionally, the high and low beam filaments of one or both headlamps may be activated at the same time for at least a transition period (such as less than approximately 5 seconds, more preferably, less than approximately 3 seconds, and most preferably, less than approximately 1.5 seconds, and preferably greater than approximately 0.1 seconds) to provide increased illumination forwardly of the vehicle, and/or to provide a generally continuous and generally constant illumination output of the headlamps as the headlamps are switched between the low and high beam states.

Accordingly, an aspect of the present invention provides a headlamp control which may control the headlamps of the vehicle such that the output of the headlamps includes a signature or coding superimposed thereon. The coded or modulated signal or signature or pattern may be superimposed on the headlamp output, or the coded signal may be identified, when no headlamps of an oncoming vehicle are detected. The present invention may also or otherwise provide that the signature of the headlamps, as distinguished by the control processor of the controlled vehicle, be different than the headlamps of an oncoming vehicle similarly equipped with an automatic headlamp control system of the present invention. The controlled vehicle receives its signature information only by reflection back to the controlled vehicle of its own headlamp light output, whereas the full intensity of an oncoming vehicle headlamp may be received at the controlled vehicle. Therefore, the amplitude intensity of any signature signal which may be carried on the light intensity of the oncoming vehicle may dominate the reflected signal, whereby the control processor of the controlled vehicle may recognize the light as being a direct light and not a reflected light. The signature characteristic of the controlled vehicle's own reflected headlamp output may be distinguished by frequency analysis, rather than intensity amplitude analysis. Such analyses may be performed by digital signal processing or the like.

According to another aspect of the present invention, an automatic headlamp control system includes an image sensor, such as an imaging array sensor, and a control. The image sensor captures an image of a scene forwardly of the vehicle and the control analyzes or processes the image to determine if a light source within the scene is indicative of a headlamp of an oncoming vehicle or a taillight of a leading vehicle. The control may adjust the state of the headlamps of the controlled vehicle between a high beam state and a low beam state in response to the image processing. The control is operable to adjust the state of the headlamps or may provide an initial current or charge or warm-up current to whichever one of the high beam lighting element and low beam lighting element which corresponds to the beam illumination state that the headlamp is being adjusted to. The headlamp control system is operable to determine whether a condition surrounding the vehicle is appropriate for adjustment of the beam illumination state of the headlamp.

The control may provide the low current or charge or warm-up current through the appropriate filament or lighting element in response to such conditions, in order to warm up the filament or lighting element without providing substantial illumination. The high beam filament or low beam filament may be activated in response to a manual input from the driver of the vehicle.

According to another aspect of the present invention, an automatic headlamp control system includes an image sensor, such as an imaging array sensor, and a control. The image sensor captures an image of a scene forwardly of the vehicle and the control analyzes or processes the image to determine if a light source within the scene is indicative of a headlamp of an oncoming vehicle or a taillight of a leading vehicle. The control adjusts the beam illumination state of the headlamps of the controlled vehicle between a high beam state and a low beam state in response to such a determination. The control is operable to provide an adjustment between the high and lower beam states via ramping up energization of one of the high beam lighting element and the lower beam lighting element while ramping down energization of the other of the high beam lighting element and the lower beam lighting element to provide a generally continuous output of the headlamps during a transition period as the headlamps are switched between the high beam illumination state and low beam illumination state.

The present invention may thus maintain a generally constant light output through the transition period via the combination of the two lamps or filaments or lighting elements of each headlamp. For example, when the headlamps are switched from their high beam state to their low beam state, the low beam filament or filaments may be increasingly charged or illuminated, while the high beam filament or filaments may be correspondingly dimmed over the transition period. The transition period may be less than approximately 5 seconds, more preferably, less than approximately 3 seconds, and most preferably, less than approximately 1.5 seconds, and preferably greater than approximately 0.1 seconds. The control may also provide for a faster ramping of the filaments or a shorter transition period for the switch from the high beams to the low beams. The present invention thus effectively provides a change in the aim of the headlamps, while maintaining a generally constant and generally continuous light output of the headlamps.

According to yet another aspect of the present invention, an automatic headlamp control system for controlling the beam illumination state of a pair of headlamps of a vehicle comprises an image sensor and a control. The image sensor has a field of view forwardly of the vehicle and is operable to capture an image of a scene forwardly of the vehicle. The control is operable to process the image to determine if a light source within the scene is indicative of a headlamp of an approaching vehicle or a taillight of a leading vehicle. The control is operable to independently adjust the beam illumination state of each of the headlamps of the controlled vehicle between a high beam state and a lower beam state in response to the image processing. The control is occasionally operable to independently adjust one of the headlamps to the lower beam state and the other of the headlamps to the high beam state in response to the image processing.

These and other objects, advantages, purposes and features of the present invention will become apparent upon review of the specification in conjunction with the drawings.

BRIEF DESCRIPTION OF THE DRAWINGS

FIG. 1 is a side elevation of a portion of a vehicle embodying the present invention; and FIG. 2 is a partial side elevation view and block diagram of a vehicle headlight dimming control system according to the present invention.

DESCRIPTION OF THE PREFERRED EMBODIMENTS

Referring now to the drawings and the illustrative embodiments depicted therein, a vehicle 10 includes a vehicle headlamp dimming control 12, which includes an image sensor 14 which senses light from a scene forward of vehicle 10, an imaging control circuit 13 which receives data from image sensor 14, and a vehicle lighting control logic module 16 which exchanges data with control circuit 13 and controls the headlamps 18 of vehicle 10 for the purpose of modifying the beam illumination state of the headlamps of the vehicle (FIGS. 1 and 2). The headlamps are operable to selectably emit a light output via a high beam lighting element and a lower beam or low beam lighting element, and may emit a light output having a signature, code or pattern superimposed thereon, as discussed below. Headlamp dimming control 12 is operable to determine whether light sources in the image captured by the image sensor are or may be indicative of headlamps of oncoming vehicles or taillights of leading vehicles and is operable to adjust the headlamps of the controlled vehicle between a high beam state and a lower beam state or low beam state in response to such a determination. Headlamp dimming control 12 may utilize the principles disclosed in U.S. Pat. No. 5,796,094, which is hereby incorporated herein by reference. Headlamp control 12 is operable to distinguish the light sources captured in the image between light sources representing headlamps or taillights of other vehicles and reflections of the headlamps of the controlled vehicle off of an object, such as a sign or the like, as discussed below.

The image sensor 14 may comprise an imaging array sensor, such as a CMOS sensor or a CCD sensor or the like, such as disclosed in U.S. Pat. Nos. 5,550,677; 5,670,935; and 5,796,094, which are hereby incorporated herein by reference. In a preferred embodiment, the control 12 includes a lens element or optic 20 between the image sensor and the forward scene. The optic is preferably an asymmetric optic, which focuses a generally central portion of the scene onto the image sensor, while providing classical distortion on the periphery of the scene or field of view.

Because it is often desirable to provide high beam illumination to objects, such as road signs or the like, the headlamp control of the present invention is operable to distinguish reflected light originating from the headlamps of the controlled vehicle from direct light from taillights of leading vehicles or even headlamps of oncoming vehicles. The present invention thus substantially limits or reduces the likelihood that the headlamps will be dimmed to the low beam state in response to the image sensor receiving a reflection of the controlled vehicle's headlamps from a sign or other object. The present invention thus allows for enhanced illumination of signs or the like forward of the vehicle, while avoiding the nuisance of such enhanced illumination causing the high beams to be unnecessarily or undesirably deactivated.

The vehicle lighting control logic module may be operable to cause the headlamps to emit light with a particular signature or code or pattern superimposed thereon, such as by encoding or partially modulating or pulsing the headlamps of the vehicle at a particular frequency (such as when the headlamps are activated, and preferably only when the high beams are activated and a light source of interest is detected in the image, and preferably when no light sources indicative of oncoming headlamps are detected). The frequency may generally correspond to or may be synchronized with the frame rate or rate at which the image sensor is capturing frames, such as, for example, a frequency of approximately 5 Hz. However, other frequencies may be implemented, such as frequencies below 5 Hz and frequencies above 5 Hz and up to or greater than approximately 60 Hz, depending on the particular application, without affecting the scope of the present invention. Optionally, the output of the headlamps may be adjusted or modulated in some variable pattern, and/or by emitting light in a particular color and/or intensity. The superimposed signature or signal may be a variation in the signal which amounts to a small variation of amplitude intensity of the headlamp, and which may be substantially non-noticeable to a human observer.

Optionally, the frequency of the signature in the headlamp output may be distinct and different from the frequency of street lights, or may be a harmonic of the frequency of street lights, such as 50 Hz, 60 Hz or their harmonics. Thus, the headlamp control of the present invention may include circuitry, software, algorithms and/or processors that have reduced sensitivity to, and preferably generally ignore, signals recognizable as street lights or the like.

The particular signature or coding or frequency of modulation of the headlamps may be fixed, such as a particular code for each vehicle manufactured, or may be varied in response to activation of the vehicle or activation of the headlamp and/or headlamp control, in order to minimize the likelihood of the headlamps of an approaching vehicle having the same code or modulation frequency as the controlled vehicle, in situations where the headlamp control may be operable to distinguish the coded signal of the controlled vehicle from oncoming headlamps. For example, the code may be randomly set each time the vehicle and/or the headlamps and/or the headlamp control are activated, or may be set in response to a variable characteristic of the controlled vehicle, such as in response to a signal from the odometer of the vehicle or the like.

The particular coded signal or signature or pattern is preferably only occasionally emitted or superimposed on the light output of the headlamp or headlamps of the controlled vehicle, or the control may only occasionally operate to distinguish the coded signal, such as when a light source of interest is detected in the captured image. Optionally, the headlamp control may be operable to distinguish the coded signal only when oncoming headlamps are not present in the captured images. For example, in the illustrated embodiment, the control may be operable to look for or detect taillights in the captured image only when no oncoming headlamp is present in the image. When no oncoming headlamps are detected, the headlamp control may then partially modulate the output of the headlamp to determine if any detected light sources are reflections from the controlled vehicle's headlamps or taillights of leading vehicles.

The image sensor of the vehicle headlamp control of the present invention is operable to capture multiple images or frames of the scene as the vehicle travels along the road. The headlamp control is operable to determine whether a sensed light source is a reflection of the vehicle's headlamps from an object in the scene. This may be accomplished by analyzing the captured frames in connection with the particular coding or signature of the headlamps of the controlled vehicle to determine if the code or pattern present in the light received coincides with the code or pattern of the light emitted by the headlamps of the controlled vehicle. The grabbing of a frame or image or frame rate is timed or set to coincide with the modulation or coded signal of the headlamps. For example, one or more frames may be captured while the headlamps are being modulated or coded, while a subsequent frame or frames may be captured while the headlamps are fully and constantly activated, or multiple frames may be captured in such a timed or synchronized manner to capture the modulated or coded signature or signal at different levels of the varying headlamp output. The control may be in communication with the headlamps so as to be able to identify a signature, code or pattern superimposed on the detected light source as the signature, code or pattern superimposed on the light output of the headlamps of the controlled vehicle. If the coded light source is detected and recognized, then the headlamp control will identify that the light source is a reflection of the vehicle's headlamps, and will not switch from the high beams to the low beams. This substantially enhances the visibility to the driver, since the high beam illumination of a sign or other object may be maintained, and the detection of the reflected light does not result in an unnecessary and undesired switch to low beam illumination.

The headlamp control or headlamps of the system of the present invention may only superimpose the signature, code or pattern on the headlamp output (or detects and recognizes the signature output) in situations where the headlamp control has already determined that there are no light sources indicative of oncoming headlamps in the captured image. However, it is further envisioned that the headlamp control of the present invention may provide that the signature as distinguished by the control processor of the controlled vehicle is different than that of an oncoming vehicle which may be similarly equipped with an automatic headlamp control system of the present invention. Because the controlled vehicle receives its signature information only by reflection of its own headlamp light output (back to the controlled vehicle), any amplitude intensity of any signature of an oncoming vehicle may substantially dominate the reflected signal, since the full intensity of an oncoming vehicle headlamp may be received by the controlled vehicle. The control processor of the controlled vehicle may be operable to recognize the received light as being a direct light and not a reflected light. Optionally, the signature characteristic of the controlled vehicle's own reflected headlamp output may be distinguished from other received light by frequency analysis, rather than amplitude intensity analysis. Such analyses may be performed by digital signal processing.

Additionally, the identification of a reflection of the vehicle's headlamps may be enhanced via other characteristics of the image being captured by the image sensor. For example, the rate of approach to the light source may be used to determine if the controlled vehicle is approaching a stationary object, a leading vehicle, or an oncoming vehicle (which would be approaching the controlled vehicle at a much greater rate of speed than a stationary object). Alternately, or in addition thereto, the location and/or lateral or vertical movement of the light source within the captured images or frames may be analyzed to determine if the light source is consistent with the location and/or lateral or vertical movement of a sign or other object or of an oncoming vehicle. Also, because reflected light is a lower intensity than direct light from the headlamps of an approaching vehicle, the intensity of the light source in the captured image may also be compared to known headlamp intensities to assist in determining whether the light source is a headlamp of an oncoming vehicle or a reflection. Also, the pattern of the light source may be considered. For example, a reflected light may be a single light source in the captured image emanating from a source to the right or the left of the lane in which the controlled vehicle is traveling (and, thus, likely emanating from or reflecting from a street sign or the like), while headlamps of an oncoming vehicle are typically a pair of light sources side by side one another and may be positioned more toward a central region of the captured image.

When the headlamp control of the present invention has determined that no oncoming headlamps or leading taillights are present in the forward scene, it may be further operable to determine if it is inappropriate to switch to high beams, such as due to inclement weather conditions. The vehicle headlamp control of the present invention thus may utilize similar principles as discussed above to identify precipitation, such as rain, snow, mist or fog in front of the vehicle. When rain, snow, mist or fog or the like is present, the reflected light is scattered back toward the controlled vehicle as a veil of scattered light, whereby the reflected light increases the illumination level received by the image sensor and decreases the contrast ratio of the image being captured by the image sensor. The headlamp control may be operable to determine a change in the contrast ratio of the captured image to identify snow, fog, mist and/or the like in front of the vehicle. The headlamp control may be further operable to automatically adjust the headlamps of the vehicle in response to such a determination, such as to automatically activate the fog lamps of a vehicle or to switch the headlamps to their low beams, or may be operable to maintain the headlamps in their low beam state. The headlamp control may recognize that the light sources in the captured image are reflections using the principles discussed above, and may further determine that the light sources are reflections from snow, fog, mist or the like (and not reflections from signs or other objects), in response to the spatial location of the light sources. For example, snow, fog, mist or the like will typically be positioned directly in front of the vehicle, while a sign or other object may be positioned to one side of the road.

It is further envisioned that the headlamp control of the present invention may be operable to individually or independently control or adjust the high beam/low beam illumination state of each headlamp of a pair of headlamps. For example, the headlamp control may be operable to dim a left headlamp to the low beam state, while switching a right headlamp to the high beam state. This may provide additional illumination toward one side of the road, such as the right side of the road, while limiting glare toward a driver of an approaching vehicle. Clearly, however, the left headlamp may be switched to its high beam state, while the right headlamp may be switched to its low beam state, without affecting the scope of the present invention.

The independent and separate control of the individual headlamps may be performed in response to detection and/or identification of light sources in the captured image. For example, if the headlamp control determines that a light source in the captured image is a reflection of the controlled headlamps off of an object to one side of the road, and further determines that an oncoming vehicle is approaching, the headlamp control may dim one of the headlamps to reduce or limit the glare toward the driver of the oncoming vehicle, while maintaining the other headlamp in its high beam state to enhance the illumination of the object for the driver of the controlled vehicle. Optionally, the individual state of the headlamps may be set in response to a steering position or orientation of the steering wheel or of the front wheels of the vehicle, and an appropriate combination of high beam and low beam illumination may be selected in order to provide enhanced illumination of a scene around a curve or turn, while minimizing glare toward an oncoming vehicle around the curve or turn.

Optionally, the high and low beam filaments of one or both headlamps may be activated at the same time to further enhance the illumination forwardly of the vehicle. Also, the headlamp control of the present invention may be operable to activate the low beam of one or both of the headlamps prior to deactivating the high beam of one or both of the headlamps. Optionally, one of the filaments or light elements may be ramped up while the other filament or light element is correspondingly ramped down so as to provide a generally continuous and generally constant illumination output from the headlamps when switching the headlamps between the high beam state and the low beam state.

In order to enhance the life cycle of headlamps, the headlamp control of the present invention may be operable to charge or "warm up" the filament of the high beam and/or the filament of the low beam of the headlamps, such as has long been known in the automotive lighting art, so there is less of a hard turn on or activation of the high beams and/or low beams of the headlamps. The headlamp control of the present invention may further be operable to automatically charge or "warm up" the filament of the high beam in situations where it is likely that the high beams may be activated. The headlamp control may detect or identify the surrounding conditions of the vehicle to determine if it is likely that the driver will activate the high beams of the headlamps. For example, the headlamp control may determine an ambient light level and may determine if the vehicle is being driven in a rural area (few or no other light sources present in the image captured). If the ambient light level is below a threshold level and few or no other light sources are present in the captured image, the headlamp control may determine that the vehicle is being driven in a situation where the driver is likely to activate the high beams of the headlamps. In such situations, the headlamp control may initiate a low current or trickle of current or warm-up current through the high beam filament or lighting element of the headlamps to warm up or charge the high beam filament without causing the filament to substantially illuminate or emit light. The initial or warm-up current may be a low current, such as, for example, a current of less than or equal to approximately 250 mA (such as for vehicle ignition within a 9 volt to 16 volt range and 12 volts nominal). The high beam filament may thus be warmed up and ready for use should the driver activate the high beams of the headlamps. Optionally, the low beam filament or lighting element may be charged via an initial warm-up current when the control determines that it may be suitable for low beam illumination.

Optionally, the headlamp control of the present invention may be operable to provide a generally continuous and constant output of the headlamps during a transition period as the headlamps are switched between the high beam state and the low beam state. The headlamp control may thus maintain a generally constant light output through the transition period via the combination of the two lamps or filaments of each headlamp and, thus, may effectively provide a change in aim of the headlamps, while maintaining a generally constant output or intensity. This is accomplished by ramping up one filament or lighting element (such as the high beam filament or filaments) while correspondingly ramping down, fading or dimming the other filament or lighting element (such as the low beam filament or filaments). The corresponding low beam and high beam mix or combination may effectively maintain a generally constant output or illumination by the combination of the two lamps/filaments of the headlamps during the transition period. For example, when the headlamps are switched from their high beam state to their low beam state, the low beam filament or filaments may be increasingly charged or illuminated, while the high beam filament or filaments may be correspondingly dimmed over the transition period. The transition period may be less than approximately 5 seconds, more preferably, less than approximately 3 seconds, and most preferably, less than approximately 1.5 seconds, and preferably greater than approximately 0.1 seconds. Because it is important to quickly switch from high beams to low beams when a vehicle approaches, such as when a vehicle comes into view over a hill or around a corner, the headlamp control of the present invention may also provide for a faster ramping of the filaments or a shorter transition period for the switch from the high beams to the low beams.

Optionally, the headlamp control of the present invention may utilize principles of other smart headlamp controls, such as disclosed in U.S. Pat. Nos. 6,097,023 and 5,796,094, and in U.S. patent application Ser. No. 10/355,454, filed Jan. 31, 2003 by Schofield et al. for VEHICLE ACCESSORY MODULE, now U.S. Pat. No. 6,824,281, all of which are hereby incorporated herein by reference. The headlamp control may be operable to detect and recognize various street and/or traffic signs via the image sensor. The image sensor and headlamp control may further be operable to recognize the speed limit numbers on a speed limit sign and to warn the driver if the vehicle exceeds the speed limit by a predetermined amount. The headlamp control may have an interface (such as voice, touch screen, etc.) that would set a personal threshold for over-speed warning.

Such a headlamp control system may be implemented for warning signs (turns, hills, etc.) or the like. For example, the image sensor and headlamp control may be operable to detect and recognize a railroad crossing sign and to further recognize that the railroad crossing sign is activated (such as by distinguishing the flashing lights characteristic of a railroad crossing signal) due to an approaching train. The control system could then warn the driver that the vehicle is approaching a dangerous condition. Additionally, the image sensor and headlamp control may be operable to detect other signals, such as a school bus stopping signal or a pedestrian road crossing signal or the like.

In many new vehicles, the headlamps are typically high intensity discharge headlamps, which require that the headlamps be directed generally parallel to the road, in order to prevent the headlamps from being directed toward the eyes of drivers in oncoming traffic. The headlamp control of the present invention may be operable to detect whether the headlamps are directed more toward the sky or toward the road and then automatically adjust them to make them generally parallel to the road. Additionally, the headlamp control may be operable to control the attitude of the vehicle and/or the pitch of the vehicle in response to a detection of the direction in which the headlamps are directed.

Therefore, the headlamp control of the present invention allows the headlamps of the vehicle to be maintained in their high beam state while illuminating an object along the road, such as a sign or the like. The present invention avoids ignoring the taillights and/or headlamps of other vehicles by distinguishing between other headlamps and a signature, code or pattern superimposed on the light output of the headlamps of the controlled vehicle. Thus, the present invention encompasses encoding or otherwise modulating the output of a headlamp with a tag or signature signal or pattern that allows the headlamp control circuitry of the present invention to distinguish the reflected presence of the headlamps of the controlled vehicle (and thus restrain from initiating a change in headlamp status, such as from a high beam state to a low beam state). The headlamp control of the present invention may be operable to individually switch each headlamp of the vehicle between the high beam and low beam states to simultaneously enhance illumination of objects in front of the controlled vehicle and reduce glare to drivers of other vehicles. The headlamp control of the present invention may also or otherwise be operable to ramp up and ramp down the intensity output of the filaments of the high and low beams to provide a generally constant illumination output from the headlamps as they are switched between the high beam state and the low beam state. The headlamp control may also or otherwise provide an initial current or charge to a high or low beam filament to ramp up the change between the high beam and low beam states of the headlamps. The headlamp control may provide an initial low current or warm-up current to the high beam filament in situations where it is likely that the high beams will be actuated by the driver of the vehicle or by the automatic headlamp control and/or may provide an initial low current or warm-up current to the low beam filament in situations where it is likely that the low beams will be actuated by the driver or by the automatic headlamp control.

Changes and modifications in the specifically described embodiments can be carried out without departing from the principles of the present invention, which is intended to be limited only by the scope of the appended claims, as interpreted according to the principles of patent law.

The invention claimed is:

1. An automatic headlamp control system for controlling the beam illumination state of headlamps of a vehicle, said automatic headlamp control system comprising:

a first headlamp located at a front driver side of the vehicle and a second headlamp located at an opposing front passenger side of the vehicle, each of said first and second headlamps comprising a high beam lighting element for providing high beam illumination in a high beam state and a lower beam lighting element for providing lower beam illumination in a lower beam state;

an image sensor having a field of view forwardly of the vehicle, said image sensor capturing image data of a scene forwardly of the vehicle;

a control operable to process said image data to determine if a light source within the scene is indicative of a headlamp of an approaching vehicle or a taillight of a leading vehicle;

said control being operable to adjust the beam illumination state of said first headlamp between its high beam state and its lower beam state independent of adjustment of said second headlamp between its high beam state and its lower beam state; and said control adjusting said first headlamp to its lower beam state in response to a determination that a detected light source in the captured image is indicative of a headlamp of an approaching vehicle in the forward field of view, said control adjusting or maintaining the beam illumination state of said second headlamp independent of the adjustment of said first headlamp in response to the determination.

2. The automatic headlamp control system of claim 1, wherein said control ramps energization and deenergization of the lighting elements of said first and second headlamps when adjusting the beam illumination state of said first and second headlamps.

3. The automatic headlamp control system of claim 2, wherein said control is operable to ramp up energization of the lower beam lighting element of said first headlamp while ramping down energization of the high beam lighting element of said first headlamp to provide a generally continuous output of said first headlamp during a transition period as said first headlamp is adjusted from its high beam state to its lower beam state.

4. The automatic headlamp control system of claim 3, wherein said control is operable to adjust the beam illumination state of said second headlamp from its lower beam state to its high beam state while adjusting the beam illumination state of said first headlamp from its high beam state to its lower beam state.

5. The automatic headlamp control system of claim 1, wherein said control is operable to adjust said second headlamp to its high beam state in response to a determination that a detected light source in the captured image is a reflection of at least one of said headlamps of the controlled vehicle.

6. The automatic headlamp control system of claim 1, wherein said control is operable to provide a warm-up current to at least one of (a) said high beam lighting element and (b) said lower beam lighting element when adjusting the beam illumination state of said first or second headlamp.

7. The automatic headlamp control system of claim 6, wherein said control is operable to provide said warm-up current to the high beam lighting element in response to a determination that a condition surrounding the vehicle is appropriate for high beam illumination.

8. The automatic headlamp control system of claim 7, wherein said control is operable to provide said warm-up current to the high beam lighting element to warm up the high beam filament without providing high beam illumination.

9. The automatic headlamp control system of claim 6, wherein said control is operable to provide said warm-up current in response to a determination that a condition surrounding the vehicle is appropriate for adjustment of the beam illumination state of the headlamp.

10. The automatic headlamp control system of claim 9, wherein said determination that a condition surrounding the vehicle is appropriate for adjustment of the beam illumination state is made in response to at least one of an ambient light level and a quantity of light sources in said captured image.

11. The automatic headlamp control system of claim 1 including a manual input device, the high beam lighting element of at least one of said first and second headlamps being activatable in response to actuation of said manual input device.

12. An automatic headlamp control system for controlling the beam illumination state of headlamps of a vehicle, said automatic headlamp control system comprising:

a first headlamp located at a front driver side of the vehicle and a second headlamp located at an opposing front passenger side of the vehicle, each of said first and second headlamps comprising a high beam lighting element for providing high beam illumination in a high beam state and a lower beam lighting element for providing lower beam illumination in a lower beam state;

an image sensor having a field of view forwardly of the vehicle, said image sensor capturing image data of a scene forwardly of the vehicle;

a control operable to process said image data to determine if a light source within the scene is indicative of a headlamp of an approaching vehicle or a taillight of a leading vehicle;

said control being operable to independently adjust the beam illumination states of said first and second headlamps; and said control adjusting said first headlamp to its lower beam state in response to a determination that a detected light source in the captured image is indicative of a headlamp of an approaching vehicle in the forward field of view, said control adjusting or maintaining the beam illumination state of said second headlamp independent of the adjustment of said first headlamp in response to the determination; and said control ramping energization and deenergization of the lighting elements of said first and second headlamps when adjusting the beam illumination state of said first and second headlamps.

13. The automatic headlamp control system of claim 12, wherein said control is operable to adjust said second headlamp to its high beam state in response to a determination that a detected light source in the captured image is a reflection of at least one of said headlamps of the controlled vehicle.

14. The automatic headlamp control system of claim 12, wherein said control is operable to provide a warm-up current to at least one of (a) said high beam lighting element and (b) said lower beam lighting element when adjusting the beam illumination state of said first or second headlamp.

15. The automatic headlamp control system of claim 12 including a manual input device, the high beam lighting element of at least one of said first and second headlamps being activatable in response to actuation of said manual input device.

16. An automatic headlamp control system for controlling the beam illumination state of headlamps of a vehicle, said automatic headlamp control system comprising:

a first headlamp located at a front driver side of the vehicle and a second headlamp located at an opposing front passenger side of the vehicle, each of said first and second headlamps comprising a high beam lighting element for providing high beam illumination in a high beam state and a lower beam lighting element for providing lower beam illumination in a lower beam state;

an image sensor having a field of view forwardly of the vehicle, said image sensor capturing image data of a scene forwardly of the vehicle;

a control operable to process said image data to determine if a light source within the scene is indicative of a headlamp of an approaching vehicle or a taillight of a leading vehicle;

said control being operable to independently adjust the beam illumination states of said first and second headlamps;

said control adjusting said first headlamp to its lower beam state in response to a determination that a detected light source in the captured image is indicative of a headlamp of an approaching vehicle or a taillight of a leading vehicle in the forward field of view, said control adjusting or maintaining the beam illumination state of said second headlamp independent of the adjustment of said first headlamp in response to said determination; and wherein said control is operable to provide a warm-up current to at least one of (a) said high beam lighting element and (b) said lower beam lighting element when adjusting the beam illumination state of said first or second headlamp.

17. The automatic headlamp control system of claim 16, wherein said control ramps energization and deenergization of the lighting elements of said first and second headlamps when adjusting the beam illumination state of said first and second headlamps.

18. The automatic headlamp control system of claim 16, wherein said control is operable to adjust said second headlamp to a high beam state in response to a determination that a detected light source in the captured image is a reflection of at least one of said headlamps of the controlled vehicle.

19. The automatic headlamp control system of claim 16 including a manual input device, the high beam lighting element of at least one of said first and second headlamps being activatable in response to actuation of said manual input device.

* * * * *